United States Patent
Iwashiro

[19]
[11] Patent Number: 5,847,527
[45] Date of Patent: Dec. 8, 1998

[54] METHOD AND APPARATUS FOR DIGITAL POSITION CONTROL

[75] Inventor: Masafumi Iwashiro, Tokyo, Japan

[73] Assignee: Kabushiki Kaisha Toshiba, Kanagawa-ken, Japan

[21] Appl. No.: 926,528

[22] Filed: Sep. 10, 1997

[30] Foreign Application Priority Data

Jun. 26, 1997 [JP] Japan .................................... 9-170197

[51] Int. Cl.$^6$ ................................................ G05B 13/00
[52] U.S. Cl. ......................... 318/561; 318/560; 318/632; 318/434
[58] Field of Search .................................... 318/560, 561, 318/616, 632, 434; 360/78.12, 78.04, 78.9, 78.06; 369/32

[56] References Cited

U.S. PATENT DOCUMENTS

| | | | |
|---|---|---|---|
| 4,405,956 | 9/1983 | Marshall | 360/76 |
| 4,638,230 | 1/1987 | Lee | 318/632 |
| 5,369,345 | 11/1994 | Phan et al. | 318/561 |
| 5,465,183 | 11/1995 | Hattori | 360/78.9 |
| 5,469,414 | 11/1995 | Okamura | 369/32 |
| 5,691,617 | 11/1997 | Funches | 318/632 |

FOREIGN PATENT DOCUMENTS

| | | | |
|---|---|---|---|
| 6-259877 | 9/1994 | Japan | G11B 19/16 |
| 9-502825 | 3/1997 | Japan | G11B 21/10 |

*Primary Examiner*—William M. Shoop, Jr.
*Assistant Examiner*—Rita Leykin
*Attorney, Agent, or Firm*—Limbach & Limbach LLP

[57] ABSTRACT

A digital position control system having a model of a plant therein is applied to a head position control system for a HDD in which a head moving unit is made to be a plant. A CPU of the HDD performs bang—bang control of the model to control movement of the head, and performs model following control to cause the head moving unit to follow the control of the model. Moreover, the CPU determines all of control input values attributable to dead beat control are smaller than an input limit value in a state of a deceleration state caused by the bang—bang control. When all of control input values are smaller than the input limit value of the plant, the CPU performs switching control to switch the bang—bang control to the dead beat control.

12 Claims, 6 Drawing Sheets

METHOD AND APPARATUS FOR DIGITAL POSITION CONTROL

BACKGROUND OF THE INVENTION

The present invention relates to control of the position of a head of, for example, a disk storage device, and more particularly to a method and an apparatus for digital position control of a plant of a type, control input to which is limited.

Recently, digital control using a microcomputer (CPU) has been generally adapted to, for example, a hard disk drive (HDD), because of the complicated contents to be controlled and a requirement for improving the performance. The digital control using the CPU is performed such that a state of the plant is observed periodically and a control law described in the form of a program is performed to supply control input to the plant. That is, the digital control using the CPU is able to realize an advanced control law only by description of a program. However, adaptation of a conventional control law determined on the assumption of a continuous period of time must consider a sampling period and time delay occurring in calculations which are performed by the CPU.

As one of optimal control methods, time optimal control has been known in which shift from an initial state (for example, start of head movement) to a final state (for example, completion of the movement to a required position for the head) is performed in a shortest time. As the time optimal control, a method called as "bang—bang control" has been known. The bang—bang control is a control method using only a binary value (corresponding to the sign of the input error) of either a maximal value or a minimal value. Specifically, rotation of, for example, a voice coil motor (VCM) having input limit is controlled to be adapted to a head position control system for controlling movement of a head to a required position by accelerating or decelerating the movement velocity.

On the other hand, a method called as "a dead beat control (finite time settling control)" has been known as another digital control system. The foregoing method is control in which control input is switched by a predetermined number of times for each sampling. After the sequential control input has been added, finite time settling is performed in such a manner that the shift from the initial state to a required state can be performed. The predetermined number of times is calculated from the initial state and a required state and is the same as the order of the plant.

The control input for use in the dead beat control can be obtained from the following calculations:

Initially, n control inputs (input vectors) u (1), ..., u (n) which are the same as the order of the plant are, for each sampling, sequentially output from initial state (state vector) x and target value r. Moreover, the state equation of the plant is defined as follows:

$$\begin{aligned} x(k+1) &= Ax(k) + Bu(k) \\ &= A^k x(1) + A^{k-1} Bu(1) + A^{k-2} Bu(2) + \ldots + ABu(k-1) + Bu(k) \end{aligned} \quad (1)$$

Thus, shift from the initial state x to the target value r after the n samples is expressed by the following Equation (2):

$$r = A^n x + [A^{n-1}B \ A^{n-2}B \ldots AB \ B] \begin{bmatrix} u(1) \\ u(2) \\ \vdots \\ u(n-1) \\ u(n) \end{bmatrix} \quad (2)$$

where k is time and A and B are matrices.

Therefore, control inputs u (1), ..., u (n) are obtained from the following Equation (3):

$$\begin{bmatrix} u(1) \\ u(2) \\ \vdots \\ u(n-1) \\ u(n) \end{bmatrix} = [A^{n-1}B \ A^{n-2}B \ldots AB \ B]^{-1}(r - A^n x) \quad (3)$$

As described above, a system having input limit enables the bang—bang control, which is the time optimal control, to be applied to digital control (for example, head position control). However, since the digital control involves the switching of the control input being restricted by the sampling period, only the control law of the bang—bang control requiring switching of the control input at arbitrary time cannot reach a desired state (for example, the head cannot reach a desired position).

On the other hand, the dead beat control cannot instruct the upper limit for the control input because the magnitude of the control input (the controlled variable) is determined by the initial position and the target position. Therefore, the dead beat control cannot, as it is, be applied to a digital control (sampling control) having an input limit.

Referring to FIGS. 7 and 8, specific description will be performed.

FIG. 7 shows an example of change of the control input of the bang—bang control as the time elapses. FIG. 7 shows time variation 71 in a case where switching of acceleration (region AR) and deceleration (region DR1) is performed at an arbitrary timing and time variation 72 in a case where acceleration (region AR) and deceleration (region DR2) is restricted by the sampling period. FIG. 8 shows an example of time variation of the position in the case of the bang—bang control. FIG. 8 shows time variation 81 in a case where switching of acceleration and deceleration is performed at an arbitrary timing and time variation 82 in a case where switching of acceleration and deceleration is restricted by the sampling period, FIG. 8 also showing a target position 83.

As can be understood from FIGS. 7 and 8, combination of the digital control and the bang—bang control involves switching of acceleration and deceleration being restricted by the sampling period. Therefore, the digital control cannot reach the target position 83 by one time of switching of the acceleration and deceleration as compared with the switching of the acceleration and deceleration at an arbitrary timing.

BRIEF SUMMARY OF THE INVENTION

An object of the present invention is to enable a system, for example, a head positioning control system in which, for example, digital position control and bang—bang control are combined with each other, and which has an input limit, to realize a target state by time optimal control by using dead beat control.

To achieve the above-mentioned object, according to the present invention, there is provided a digital control system for performing bang—bang control comprising determining means for monitoring all of control input values at each sample in dead beat control and switching the bang—bang control to the dead beat control when all of the control input values are smaller than the input limit value of a plant.

The foregoing system is able to use the advantage of the high speed performance, which is realized by the bang—bang control and the advantage of switching of the plant at a sampling period to cause a plant to reach a target position which is realized by the dead beat control when a digital position control involving a limit of control input. Therefore, the control performance can be improved. That is, if the bang—bang control, which requires switching of control input at arbitrary time, is simply applied to digital position control in which switching of control input is restricted by the sampling period in a system having a limit for control input, a target state cannot be realized. Since the magnitude of control input is determined by the initial state and a target state in the dead beat control, the upper limit of control input cannot be instructed. Therefore, sampling control having a limit for control input cannot realize a target state. Therefore, the present invention is arranged to perform dead beat control when all of control input values at each sample are smaller than the limit input value to realize a target state. In the other cases, the bang—bang control is performed so that a high speed control operation is performed.

If the present invention is applied to a head positioning control system for example, it is preferable that determining is performed to switch the bang—bang control to the dead beat control in a deceleration state in the bang—bang control when the head is allowed to reach a target position by controlling acceleration and deceleration movement. It is preferable that the acceleration movement control is performed by the bang—bang control to realize high speed control by using control input of a maximal value.

Additional object and advantages of the invention will be set forth in the description which follows, and in part will be obvious from the description, or may be learned by practice of the invention. The object and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
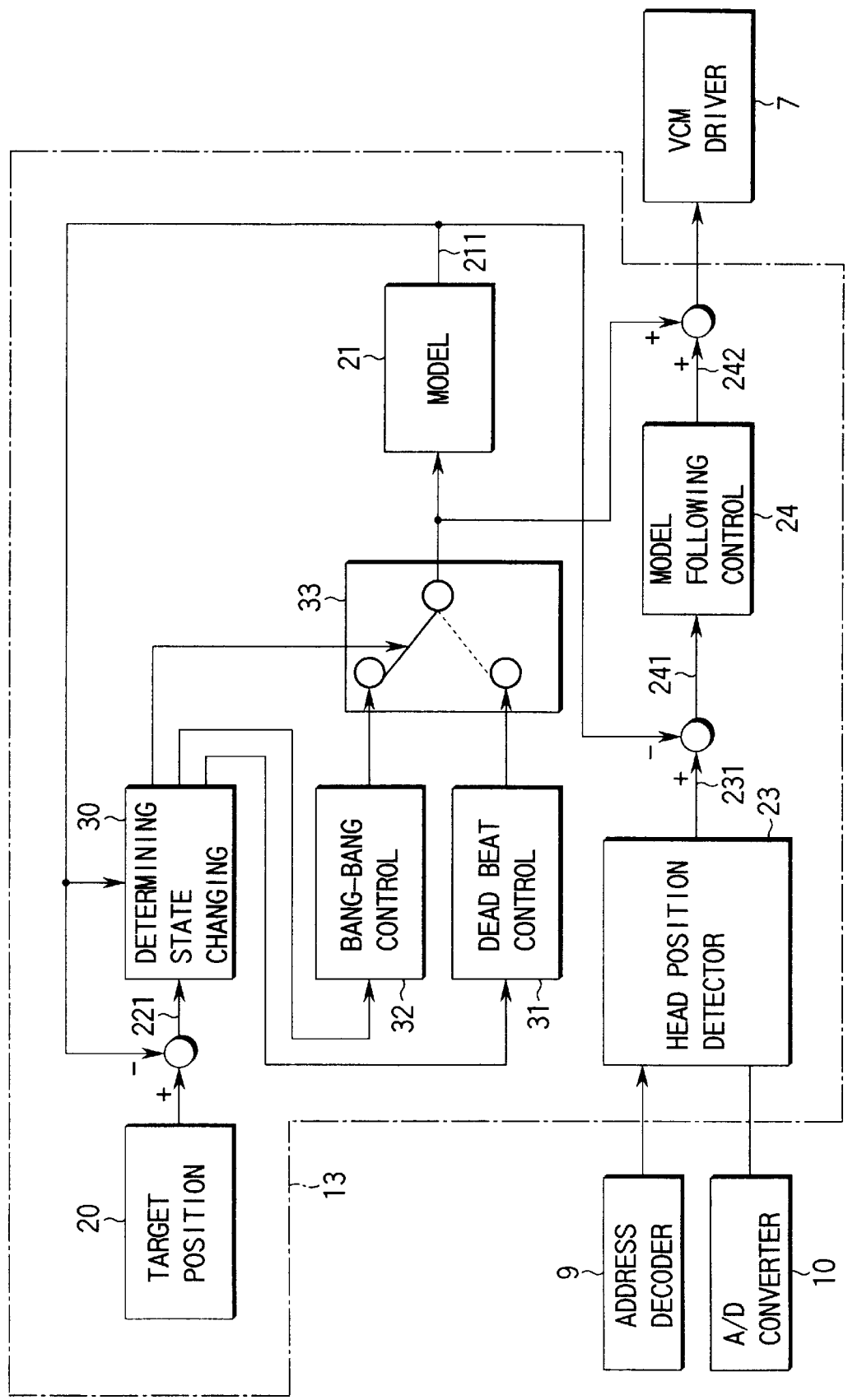
FIG. 1 is a block diagram showing a digital position control applied to seek control according to the present invention.

Referring to the drawings, an embodiment of the present invention will now be described. In this embodiment, an assumption is made that application to seek control included in head position control of a hard disk drive (HDD) is performed.

(Structure of HDD)

Figure 2:
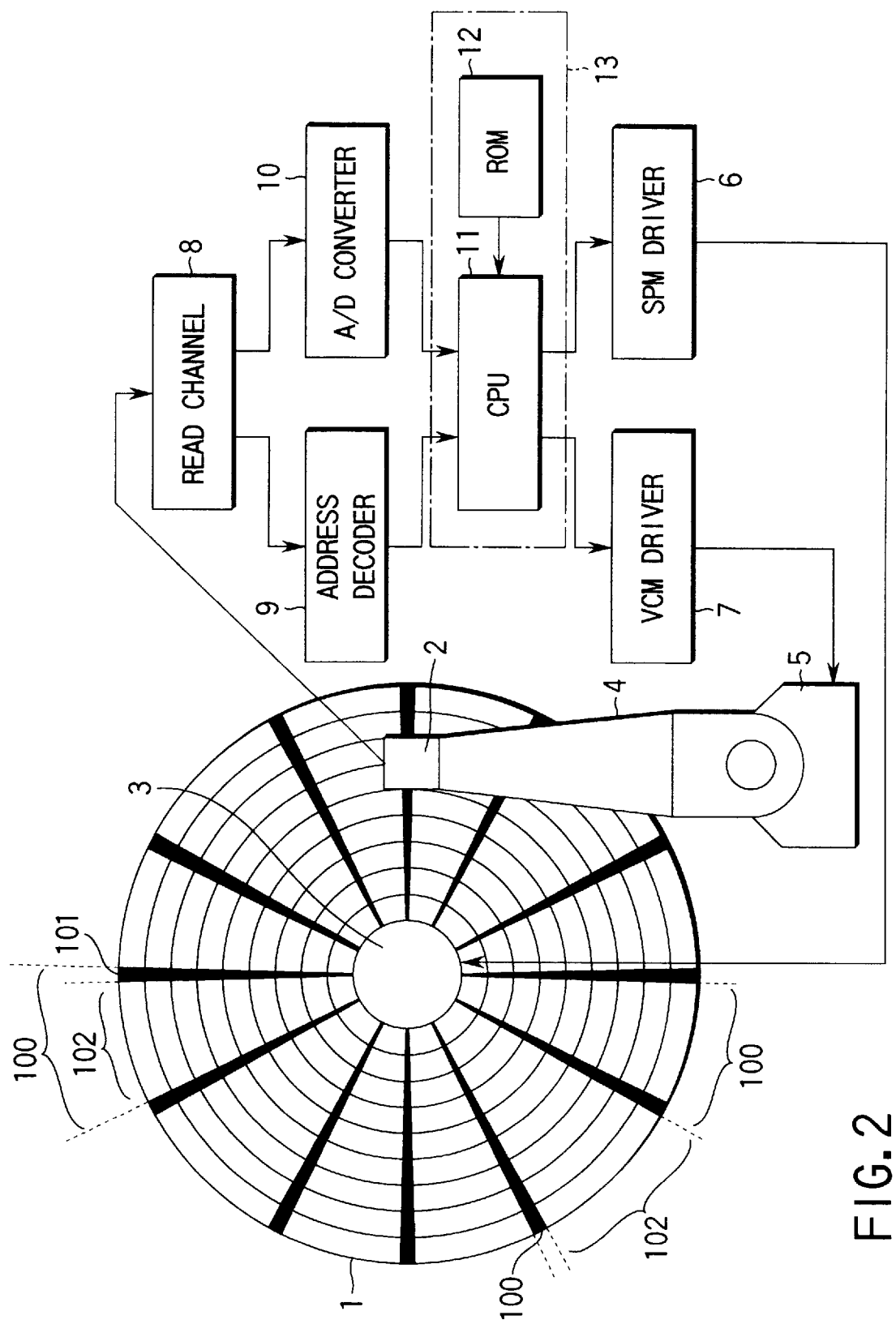
FIG. 2 is a block diagram showing major components of a disk storage device for use in the present invention.

As shown in FIG. 2, a HDD has a disk (a magnetic disk) 1, which is a medium for storing data, a head (a magnetic head) 2, an arm 4 forming a head actuator, a voice coil motor (VCM) 5 and a control input groups 8 to 12.

The head 2 is mounted on the arm 4 in such a manner that the head 2 is disposed to face each of the data sides of the disk 1 so as to read/write data to and from the data side. The head 2 is moved in the radial direction of the disk 1 attributable to the rotating force of the VCM 5. The VCM 5 is supplied with an operating current from a VCM driver 7 attributable to control performed by a CPU 11, to be described later.

One or more disks 1 are attached to a spindle motor (SPM) 3 so as to be rotated at high speed. A multiplicity of concentric tracks are formed on the two sides of the disk 1. Each track as a plurality of servo regions 101 on which servo data (position information) has been recorded and which are formed at the same intervals. The servo regions 101 are radially disposed on the disk 1 to traverse the tracks. A data region (a user data region) 102 is formed between the servo regions 101. The data region 102 has one or more data sectors. One servo region 101 and following one data region 102 form a servo sector 100 give a specific number (servo sector number).

Servo data includes track address (cylinder number) and servo burst data, in addition to the servo sector number. The track address is an identification code for each track and is used to identify the position of the head 2 with respect to the track. Servo burst data is an analog amplitude signal pattern for detecting position error (from the center of the track or the boundary from an adjacent track) of the head 2 in the range of the track.

SPM 3 is usually supplied with an operation current from a SPM driver 6 integrated with the VCM driver 7. A control variable (an operation current level) for rotating the VCM 5 is set to the VCM driver 7 attributable to a control process (digital position control according to this embodiment) performed by a CPU 11.

The head 2 is, through a head amplifier (not shown), connected to a read channel 8. The read channel 8 receives a read signal (servo data or user data) read from the disk 1 by the head 2 to perform various signal processes so as to extract and reproduce servo data or user data.

The control input groups 8 to 12 has an address decoder 9, an A/D converter 10, a CPU 11 and a ROM 12, in addition to the read channel 8. The address decoder 9 decodes servo sector number and track address from servo data extracted by the read channel 8 to output servo sector number and track address to the CPU 11. The A/D converter 10 converts servo burst data (an analog position error signal) in servo data above into, for example, 8-bit digital value to output it to the CPU 11. The CPU 11 performs a position error calculations to detect the position of the head 2 in the subject track detected in accordance with the track address. The position means position in sub-track units in one track range. The sub-track corresponds to each of concentric regions obtained by dividing one track into, for, example, 512 regions in a radial direction at predetermined intervals.

The CPU (a microprocessor) 11 and ROM 12 form a controller 13 for performing a control process including a digital position control of the HDD. The ROM 12 stores a control program for the CPU 11. The controller 13 forms a digital position control system (refer to FIG. 1) to be described later. That is, the controller 13 calculates the track position in accordance with the track address supplied from the address decoder 9. Moreover, the controller 13 calculates the position in the range of the subject track in accordance with a digital value supplied from the A/D converter 10. The controller 13 performs head position control for positioning the head 2 to a target position (the target position including a data sector to which an access will be made) in accordance with the obtained position of the head 2.

Note that elements, such as a disk controller (HDC) forming an interface between the HDD and a host computer and transferring data between the HDD and the host computer, is omitted from FIG. 2.

The head position control includes seek control for moving the head 2 to a target position (a target track) and track following control for positioning (position settling) the head 2 within a range of the target track. In this embodiment, description will be performed about the digital position control to be applied to the seek control. The seek control is arranged in such a manner that a maximal value of control input (a control variable) which is supplied to the VCM driver 7 has been set because of electric and mechanical limits.

(Digital Position Control System)

FIG. 1 is a schematic view showing a digital position control system according to this embodiment. In this embodiment, an assumption is made that the digital position control is applied to the seek control which is performed by the controller 13 of the HDD.

Figure 3:
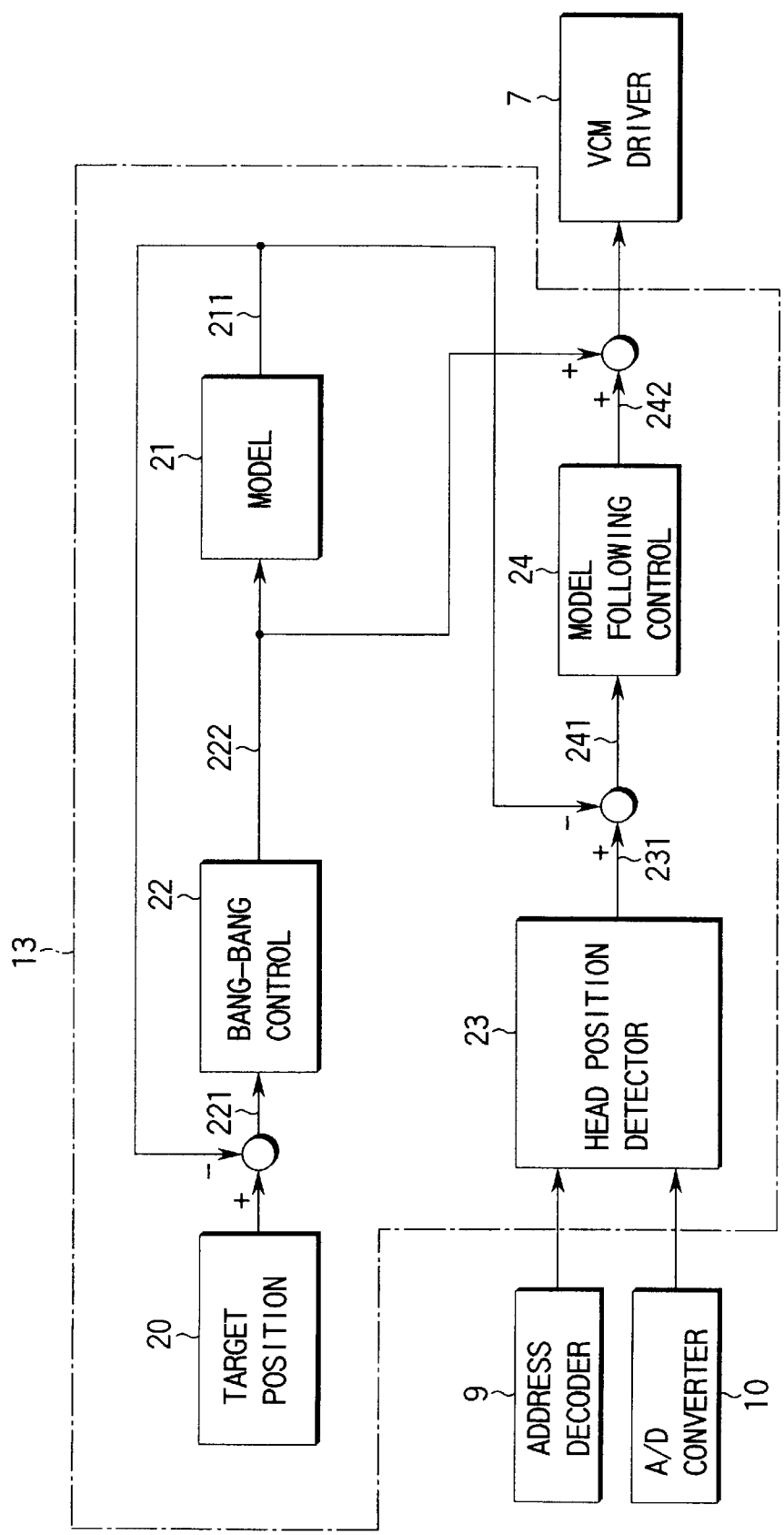
FIG. 3 is a block diagram showing an example in which bang—bang control is applied to a digital position control system relating to seek control.

FIG. 3 is a schematic view showing a structure in which the conventional bang—bang control and model following control are applied to the seek control. That is, the seek control is performed by using the bang—bang control such that a model 21 is set to a control subject (called as a "plant") in the controller 13. Moreover, the model 21 is controlled by a bang-band controller 22. The foregoing system has a model following controller 24 which is followed by the plant (which is the VCM driver 7 in the case of a HDD) in accordance with a law applied to the model 21.

The model 21, which is set to the inside portion of the controller 13, has an equation of motion for moving the head 2 to the target position (the target track) set by the target position setting unit 20. The model 21 has realized a transmission characteristic to an absolute position for the head 2 in accordance with the control input of the VCM driver 7. The bang—bang controller 22 receives an error (the difference) 221 between an absolute position (a law position) 211 of the head 2 on the model 21 and the target position indicated by the target position setting unit 20 so as to determine the position (timing) at which an acceleration position is switched to a deceleration state. Moreover, the bang—bang controller 22 determines completion of the control, and then generating a control signal (a law control input) 222 which is supplied to the model 21 and the VCM driver 7. In this case, a limit value (a maximal value which can be input) of the control input which is added to the VCM driver 7 is generated in the direction of acceleration in an acceleration state. In a deceleration state, a limit value (a maximal value which can be input) of the control input which is added to the VCM driver 7 is generated in the direction of deceleration.

On the other hand, a head position detector 23 calculates the absolute position (actual position of the head 2) 231 of the head 2 in accordance with the servo sector number and the track address (the cylinder number) supplied from the address decoder 9 and the digital value supplied from the A/D converter 10. The model following controller 24 receives an error 241 between the absolute position (a law position) 211 of the head 2 on the model 21 and the head position 231 supplied from the head position detector 23 to generate a control signal 242 with which the foregoing error is caused to approach zero. The control signal 242 supplied from the model following controller 24, that is, the signal for following the model 21 is added to a control signal 222 supplied from the bang—bang controller 22, that is, the same signal (law input) as that supplied from the bang—bang controller 22 to the model 21 so as to be supplied to the VCM driver 7.

Since the seek control of the HDD is required to move the head 2 from an arbitrary initial position on the disk 1 to a target position at high speed, the bang—bang control is effective because the acceleration and deceleration are added with the maximal value which can be input to the plant. Therefore, a bang—bang controller 22 is set in the controller 13. The bang—bang controller 22 controls the model 21. The model following controller 24 feeds back the error 241 between the actual head position 231 and the law position 211 of the model 21 so that control input is generated to cause the head 2 to follow the model 21 by adding the law input 222 so as to supply the control input to the VCM driver 7. As a result, high speed seek control can be realized. However, since the state of the model 21 in the controller 13 is updated every sampling time, also the input 221 of the bang—bang controller 22 is restricted by the period. Therefore, there arises a possibility that the switching of the acceleration and deceleration is shifted from an ideal state by one sample if the worst comes to the worst.

Therefore, this embodiment provides a digital position control employing a correction method using finite time settling control in which a dead beat controller 31 is provided for the controller 13, as shown in FIG. 1.

The system according to this embodiment has a bang—bang controller 32 having no function for determining the position (the timing) at which the acceleration state is switched to the deceleration in place of the bang-band controller 22 as shown in FIG. 3. Moreover, the system has a state transition determining section 30 and a selector 33 for selecting either a bang—bang controller 32 or a dead beat controller 31.

The state transition determining section 30 performs a process for determining a result of switching between the bang—bang controller 32 and the dead beat controller 31 and a process (a process for calculating finite time settling) for calculating a control input value from the dead beat controller 31. The selector 33 selects an output from the bang—bang controller 32 or that from the dead beat controller 31 in accordance with a result of the determination performed by the state transition determining section 30.

Similarly to the system shown in FIG. 3, the target position setting unit 20, the model 21, the head position detector 23, the model following controller 24, the state transition determining section 30, the dead beat controller 31, the bang—bang controller 32 and the selector 33 is realized by the controller 13 shown in FIG. 2.

Figure 4:
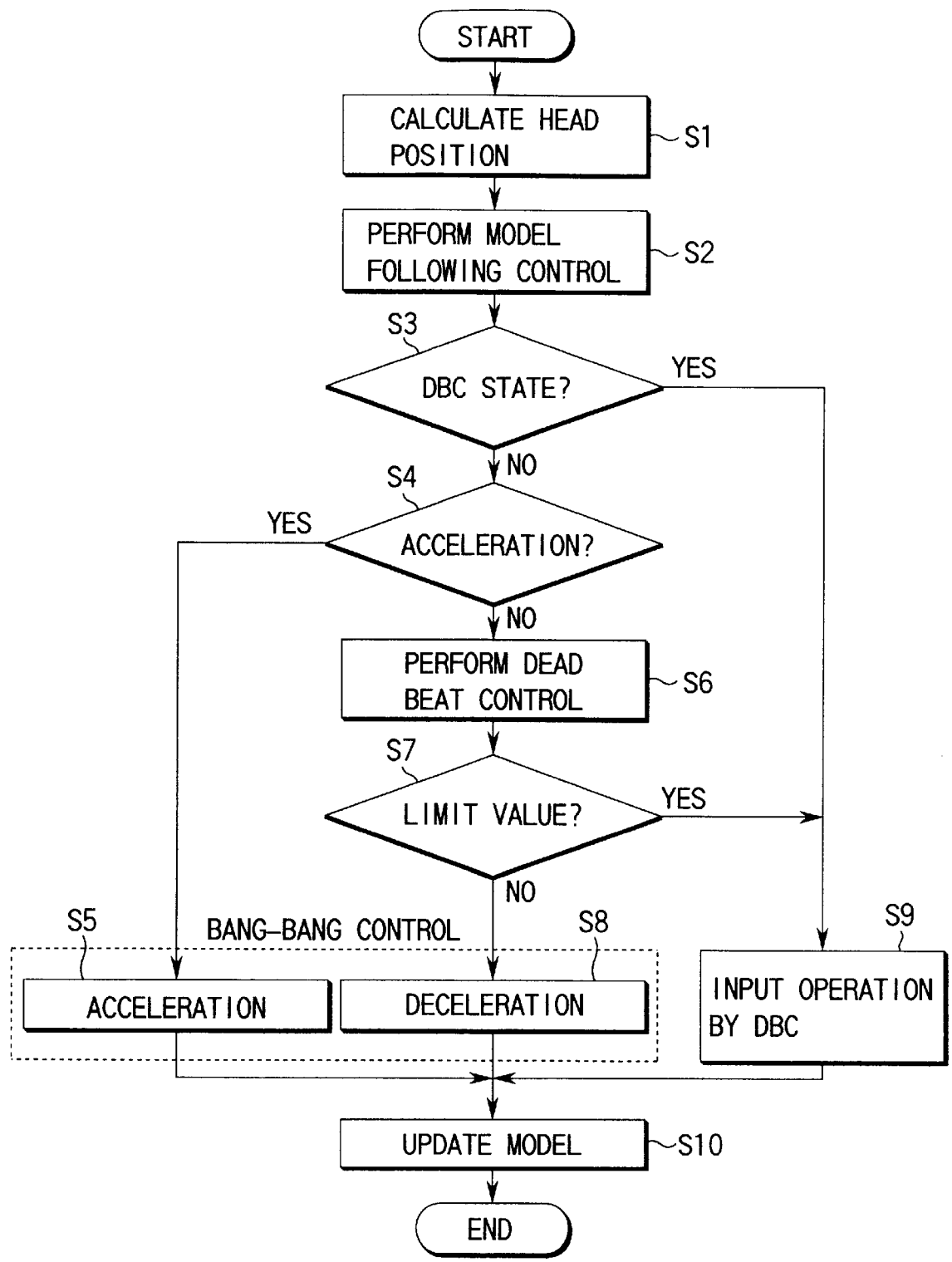
FIG. 4 is a flow chart of a control process adapted to a digital position control system according to the present invention.

Referring to a flow chart shown in FIG. 4, a process of the seek control of the system shown in FIG. 1 will now be described. The seek control which is performed by the system according to this embodiment is characterized in that the seek control is divided into three states including an acceleration state and a deceleration state performed by the bang—bang controller 32 and a finite time settling state performed by the dead beat controller 31. Moreover, an acceleration set is set when the seek is started and each state is previously stored between sample points to shift the state in accordance with the condition.

The system according to this embodiment performs the following process at each sampling from start of the seek control process. As described above, the head position detector 23 initially calculates the absolute position (the actual head position) 231 of the head 2 on the disk 1 in accordance with the servo sector number and the track address supplied from the address decoder 9 and a digital value supplied from the A/D converter 10 (step S1). The model following controller 24 receives a result of detection of the head position (the head position 231) supplied from the head position detector 23 to perform the model following control process (step S2). That is, the model following controller 24 receives an error (the difference) 241 between the absolute position (the law position) 211 of the head 2 on the model 21 and the actual head position 231 output from the head position detector 23 to generate a model following controller 24 with which the error (the difference) 241 is allowed to approach zero.

On the other hand, the state transition determining section 30 determines whether or not the control input state caused from the seek control is the finite time settling state (hereinafter called as a "DBC state") among the above-mentioned three states (step S3). If the present state is the start of the seek state, the control input state is the acceleration state performed by the bang—bang controller 32. Therefore, the state transition determining section 30 determines that the state is not the DBC state (NO in step S3). In this state, the state transition determining section 30 determines whether or not the present state is the acceleration performed by the bang—bang controller 32 (step S4). The foregoing determination is performed such that the error (the difference) 221 between the absolute position (the law position) 211 of the head 2 on the model 21 and the target position indicated by the target position setting unit 20 is received to determine whether the absolute position (the law position) 211 of the head 2 is included in the acceleration region or the same is included in the deceleration region. The boundary between the acceleration region and the deceleration region is set to a position at which the error 221 between the absolute position 211 of the head 2 and the target position is, for example, ½ of the error committed when the seek has been started. In this case, the period to the moment at which the error 221 coincides with ½ of the error committed when the seek has been started is the acceleration region (the acceleration state) and the period after the coincidence with ½ is deceleration region (the deceleration state). After switching from the acceleration state to the deceleration state has been determined owning of the detection of the coincidence of the error 221 with ½ of the error committed when the seek has been started, the necessity of checking the error 221 can be eliminated because the deceleration state is continued. That is, the state transition determining section 30 is required to check the error 221 only when the present control input value (the previous control input state) is the acceleration state to determine whether the acceleration state will be continued (whether or not the acceleration state will be determined this time) or switching to the deceleration is required.

If the control input state at present (at this time) is the acceleration state, the state transition determining section 30 controls the selector 33 to select the output from the bang—bang controller 32 so as to cause the acceleration control input to be performed (YES in step S4 and S5). As a result, the bang—bang controller 32 generates a limit value (a maximal value which can be input) of the input to be added to the VCM driver 7 in the acceleration direction and output the limit value. The output from the bang—bang controller 32 is added to a control signal 242 output from the model following controller 24 so as to be supplied as a control input to the VCM driver 7. As described above, the model following controller 24 receives the error 241 between the absolute position 211 of the head 2 on the model 21 and the actual head position 231 which is the output from the head position detector 23, and then generates a control variable 242 with which the error 241 is allowed to approach zero.

The above-mentioned control in the acceleration state is repeated by the bang—bang controller 32. When the acceleration state has been switched to the deceleration state in accordance with the error (the difference) 221 between the absolute position (the law position) 211 of the head 2 on the model 21 and the target position indicated by the head 2, the state transition determining section 30 determines that the present (current) control input state is deceleration state (NO in step S4). In this case, that is, in a case where the state is not the finite time settling state or the acceleration state, the state transition determining section 30 performs a process for calculating the finite time settling input performed by the dead beat controller 31 (step S6). That is, the value of the finite time settling input is calculated in accordance with the present state of the model 21 by the following method:

Assuming that the position of the head 2 is p, the acceleration of the head 2 is p", the input is u and the gain is k, the equation of motion of the plant is expressed as follows:

$$p"=ku$$

The acceleration p" is made to be discrete with the sampling time, thus resulting in the model 21 being obtained which can be expressed by the following Equation (4):

$$x(k+1)=Ax(k)+Bu(k) \qquad (4)$$

where $$x(k) = \begin{bmatrix} p(k) \\ p'(k) \end{bmatrix} A = \begin{bmatrix} 1 & T \\ 0 & 1 \end{bmatrix} B = \begin{bmatrix} \frac{T^2 k}{2} \\ Tk \end{bmatrix}$$

where p' is movement speed of the head 2.

Since the order of the model 21 expressed by (4) is 2, finite time settling inputs u (1) and u (2) can be obtained from the following Equation (5):

$$\begin{bmatrix} u(1) \\ u(2) \end{bmatrix} = [AB\ B]^{-1}(r - A^2 x) \quad (5)$$

$$= \frac{1}{kT^2} \left[ \begin{bmatrix} 1 & -\frac{T}{2} \\ -1 & \frac{3T}{2} \end{bmatrix} r - \begin{bmatrix} 1 & \frac{3T}{2} \\ -1 & -\frac{T}{2} \end{bmatrix} x \right]$$

When the values of the finite time settling inputs u (1) and u (2) have been obtained, the state transition determining section 30 determines whether or not both of the obtained values u (1) and u (2) of finite time settling inputs are smaller than the limit value (a maximal value which can be input) of the control input which is added to the VCM driver 7 (step S7).

If at least u (1) or u (2) is larger than the limit value of the control input which is added to the 30 determines that the finite time settling control cannot be applied. Thus, the state transition determining section 30 controls the selector 33 to select the bang—bang controller 32 to cause the deceleration control input to be performed (NO in step S7 and S8). As a result, the bang—bang controller 32 generates and outputs a limit value (a maximal value which can be input) of the control input which is added to the VCM driver 7 in the direction of the deceleration. The output from the bang—bang controller 32 is added to the control signal 242 output from the model following controller 24 so as to be supplied as the control input to the VCM driver 7. As described above, the model following controller 24 receives the error 241 between the absolute position 211 of the head 2 on the model 21 and the actual head position 231 which is the output from the head position detector 23, and then generates the control variable 242 with which the error 241 is allowed to approach zero. In the above-mentioned deceleration state performed by the bang—bang controller 32, a result of addition of the limit value of the input which is added to the VCM driver 7 in the direction of the deceleration and the model following input is made to be the control input which is added to the VCM driver 7. If both of the calculated u (1) and u (2) are smaller than the limit value of the control input which is added to the VCM driver 7, the state transition determining section 30 determined that the finite time settling control can be applied. Thus, the state transition determining section 30 shifts the deceleration state to the finite time settling state. Specifically, the state transition determining section 30 sets the calculated input value of the finite time settling to the dead beat controller 31 so as to control the selector 33 so that the output from the dead beat controller 31 is made to be output as the control input (YES in S7 and S9). As a result, the dead beat controller 31 sequentially generates and outputs the values u (1) and u (2) of the finite time settling input calculated by the state transition determining section 30 whenever step S9 is performed at each sampling. Assuming that four samples are applied as the sampling time when the equation of motion (p"=ku) of the plant has been made to be discrete for the purpose of obtaining the model 21, u (1) is output in each of the initial four samples. In each of the next four samples, u (2) is output. The output from the dead beat controller 31 is added to the control signal 242 supplied from the model following controller 24 so as to be supplied to the VCM driver 7 as the control input. As described above, a result of addition of the finite time settling input, which is output from the dead beat controller 31 at each sample and the model following input is made to be the control input to the VCM driver 7.

As described above, this embodiment is arranged such that the state transition determining section 30 calculates the finite time settling input (which is u (1) and u (2)) in accordance with Equation (5) at each sampling in the deceleration state (the deceleration region) of the bang—bang controller 32. When the absolute values of all inputs are made to be smaller than the limit value (a maximal value which can be input to the VCM driver 7) of the control input, deceleration control performed by the bang—bang controller 32 is switched to the control which is performed by the dead beat controller 31. The dead beat controller 31 switches the finite time settling inputs u (1) and u (2) into finite time settling state in which sequential input is performed at each sample. The limit value of the control input corresponds to a maximal value of an electric current which flows in the VCM 5 which operates the head 2 which is the plant.

When the acceleration control input (step S5), deceleration control input (step S8) or the finite time settling input (step S9) for one sampling point has been performed, update to a state of the model 21 at next sampling is performed in accordance with the present state of the model 21 and the input to the model 21 (step S10). Thus, the seek control of one sampling is ended.

Figure 5:
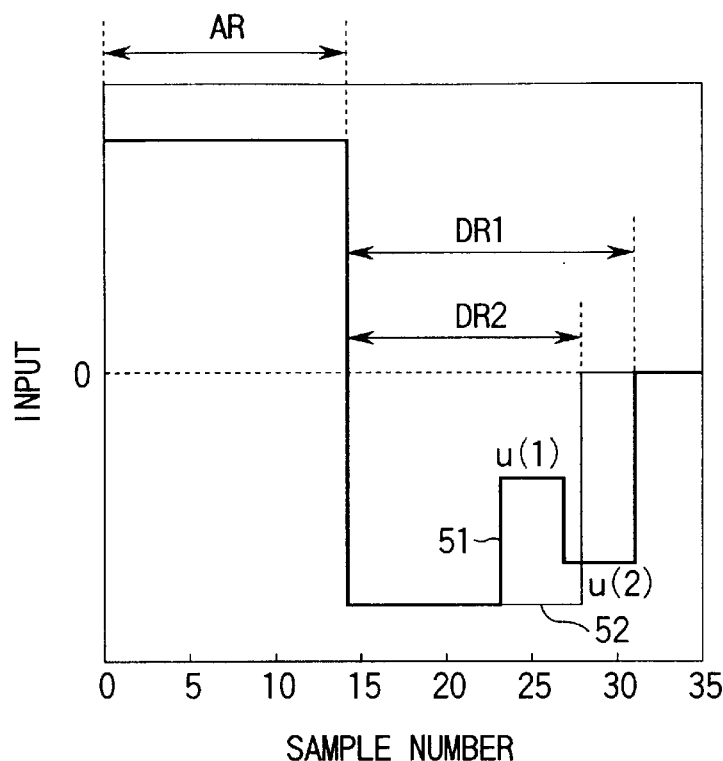
FIG. 5 is a graph showing time change of control input in the digital position control system according to the present invention.

After the state has been shifted to the finite time settling state which is performed by the dead beat controller 31, a determination is performed in step S3 that the state is the DBC state at each sampling. Therefore, the control by means of the dead beat controller 31 is performed so that the head 2 is able to reach the target position. FIG. 5 shows time change 51 of the control input with respect to the model 21 in the seek control process performed by the system shown in FIG. 1 at a predetermined distance as compared with a case where only bang—bang control is performed (time change 52 of the control input).

Figure 6:
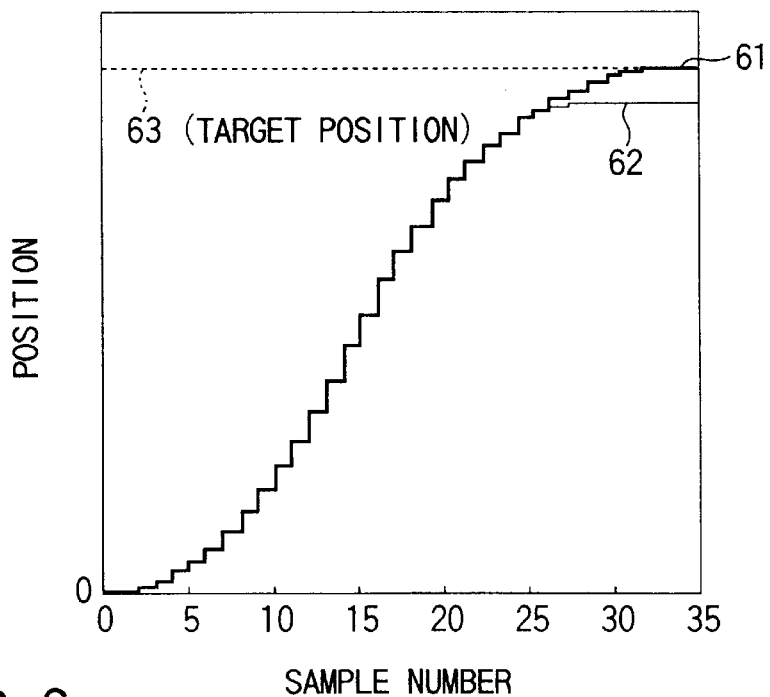
FIG. 6 is a graph showing time change of the head position in the digital position control according to the present invention.
Figure 7:
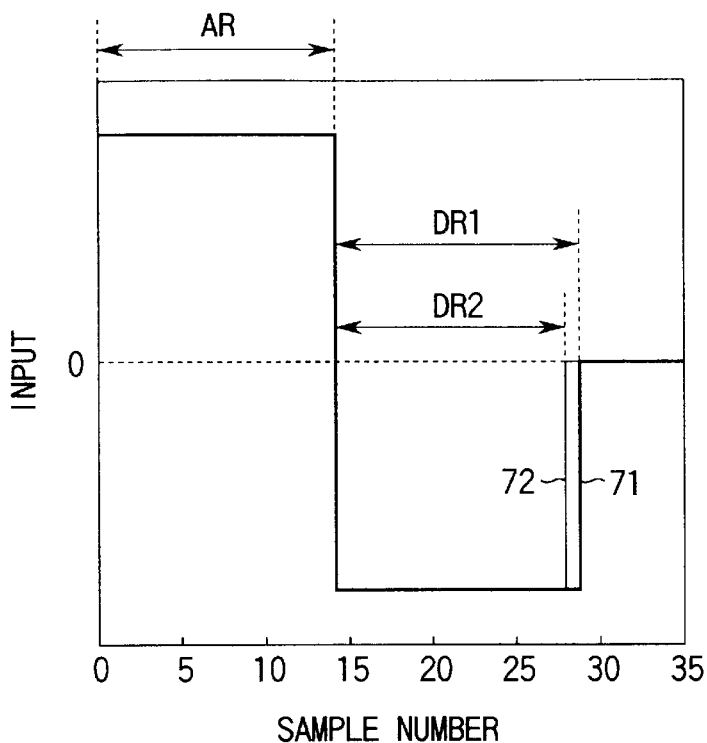
FIG. 7 is a graph showing time change of control input in a conventional bang—bang control.
Figure 8:
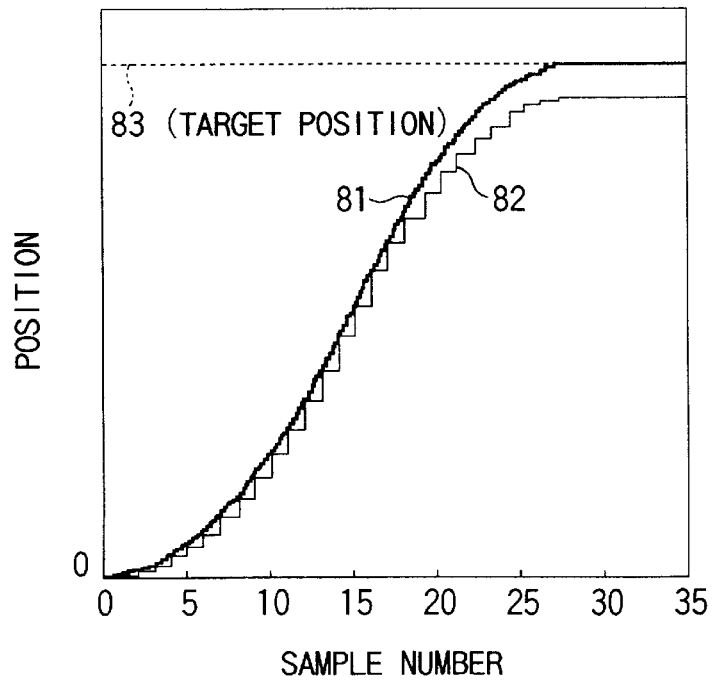
FIG. 8 is a graph showing an example of time change of the head position in the conventional bang—bang control.

FIG. 6 shows time change 61 of the head position realized by the system according to this embodiment as compared with a case where only the bang—bang control is performed (time change 62 of the head position). Reference numeral 63 represents a target position for the head 2 to reach.

As can be understood from FIGS. 5 and 6, switching of the acceleration and deceleration is restricted by the sampling time when only the bang—bang control is performed. Therefore, the head 2 cannot reach the target value 63 by one time of switching between the acceleration and the deceleration. On the other hand, the system according to this embodiment using a sub-input (u (1) and u (2)) by the finite time settling control performed by the dead beat controller 31 in the deceleration control state, the head 2 is able to reach the tarot value 63 for an arbitrary seek distance.

Although the above-mentioned embodiment has the structure in which the state transition determining section 30 has the function of calculating the finite time settling input, the function of calculating the finite time settling input may be provided for the dead beat controller 31. Although the description has been performed in the foregoing embodiment in which the present invention is applied to the head position control system for the HDD, the present invention may be applied to a digital position control system for a magnet optical disk apparatus if the system has a plant which performs acceleration and deceleration.

As described above, according to the present invention, in which the bang—bang control and the dead beat control (the finite time settling control) are combined with each other, arrival to a target position can be controlled in a shortest time in a digital position control system having a limit for the control input.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. A system for digital position control comprising:

bang—bang control means for performing bang—bang control to position a plant to a target position;

dead beat control means for performing dead beat control for positioning the plant to a target position by calculating a control input value at each of predetermined sampling timings and switching the control input value; and determining means for switching the bang—bang control to the dead beat control when all of the control input values for each sample are smaller than an input limit value of the plant.

2. The system according to claim 1, wherein said bang—bang control means performs the bang—bang control for moving the plant to the target position in an acceleration state or a deceleration state; and said determining means stores the acceleration state and the deceleration state when the bang—bang control has been performed and a state of the dead beat control and switches the bang—bang control to the dead beat control when all of the control input values are smaller than the input limit value when the state is the deceleration state.

3. The system according to claim 1, further comprising:

model following control means having a model of a plant having a predetermined input limit value and causing the plant to follow the control of the model, wherein
said bang—bang control means and said dead beat control means perform control of said model;
means is provided which performs switching between said bang—bang control means and said dead beat control means; and
said determining means controls said switching means when all of the control input values are smaller than the input limit value to switch said bang—bang control to said dead beat control.

4. The system according to claim 3, wherein said switching means selects an output from said bang—bang control means or that from said dead beat control means under control of said determining means to supply the selected output to said model and adds the output to the input to said model following control means.

5. The system according to claim 3, wherein said plant is a head for use in a disk storage device, and said model following control means is means for performing head positioning control for positioning said head to a target position on said disk.

6. A system for digital position control of a head in a disk storage device, comprising:

determining means for detecting the actual position of said head when said head is moved to a target position on said disk;

model set means for setting a mode of a plant when means for moving said head is assumed to be a plant having an input limit value;

model following control means for causing said plant to follow the control of said model set by said model set means;

bang—bang control means for performing bang—bang control for moving said model to a target position in an acceleration state or a deceleration state;

dead beat control means for performing dead beat control for positioning said model to the target position by calculating and switching a control input value at each of predetermined sampling timings; and determining means for switching said bang—bang control to said dead beat control when all of control input values at each sample are smaller than the input limit value of said plant.

7. The system according to claim 6, wherein said determining means stores the acceleration state and the deceleration state when the bang—bang control has been performed and a state of the dead beat control and switches the bang—bang control to the dead beat control when all of the control input values are smaller than the input limit value when the state is the deceleration state.

8. The system according to claim 6, further comprising:

means for switching said bang—bang control means and said dead beat control under control of said determining means, wherein
said switching means selects an output from said bang—bang control means or that from said dead beat control means to supply the selected output to said model and adds the output to the input to said model following control means.

9. The system according to claim 6, wherein a CPU of said disk storage device performs the operation of each of said determining means, said model set means, said model following control means, said bang—bang control means, said dead beat control means and said determining means.

10. A method of digital position control, comprising the steps of:

performing bang—bang control for positioning a plant to a target position;

performing dead beat control for positioning the plant to the target position by calculating and outputting a control input value at each of predetermined sampling timings; and switching said bang—bang control to said dead beat control when all of control input values at each sample are smaller than the input limit value of said plant.

11. A method of digital position control of a head in a disk storage device, the method comprising the steps of:

detecting the actual position of said head when said head is moved to a target position on said disk;

performing model following control for causing said plant to follow the control of a model of said plant when means for moving said head is assumed to be a plant having an input limit value;

performing bang—bang control for moving said model to a target position in an acceleration state or a deceleration state;

performing dead beat control for positioning said model to the target position by calculating and switching a control input value at each of predetermined sampling timings; and switching said bang—bang control to said dead beat control when all of control input values at each sample are smaller than the input limit value of said plant.

12. The method according to claim 11, wherein said bang—bang control is switched to said dead beat control all of the control input values at each sample are smaller than the input limit value of said plant, and an output obtained from execution of said bang—bang control or an output obtained from execution of said dead beat control is selected to be supplied to said model and supplied to said model following control.

* * * * *